(12) United States Patent
Wakao (10) Patent No.: US 11,415,485 B2
(45) Date of Patent: Aug. 16, 2022

(54) TIRE STATE DETECTION DEVICE FOR DETECTING A STATE OF A TIRE OF A MINE TRANSPORTATION VEHICLE

(71) Applicant: BRIDGESTONE CORPORATION, Tokyo (JP)

(72) Inventor: Yasumichi Wakao, Tokyo (JP)

(73) Assignee: BRIDGESTONE CORPORATION, Tokyo (JP)

(*) Notice: Subject to any disclaimer, the term of this patent is extended or adjusted under 35 U.S.C. 154(b) by 64 days.

(21) Appl. No.: 17/047,888

(22) PCT Filed: Dec. 8, 2018

(86) PCT No.: PCT/JP2018/045196
§ 371 (c)(1),
(2) Date: Oct. 15, 2020

(87) PCT Pub. No.: WO2019/207835
PCT Pub. Date: Oct. 31, 2019

(65) Prior Publication Data
US 2021/0164868 A1 Jun. 3, 2021

(30) Foreign Application Priority Data
Apr. 27, 2018 (JP) .............................. JP2018-087563

(51) Int. Cl.
*G01M 17/02* (2006.01)
*B60C 19/00* (2006.01)
*B60C 23/04* (2006.01)

(52) U.S. Cl.
CPC ............. *G01M 17/02* (2013.01); *B60C 19/00* (2013.01); *B60C 23/0488* (2013.01); *B60C 2019/004* (2013.01)

(58) Field of Classification Search
None
See application file for complete search history.

(56) References Cited

U.S. PATENT DOCUMENTS 6,278,361 B1* 8/2001 Magiawala ......... B60C 23/0494
73/11.04
7,161,476 B2* 1/2007 Hardman ............ B60C 23/0452
340/10.33
(Continued)

FOREIGN PATENT DOCUMENTS

JP 2005-227141 A 8/2005
JP 2007-153034 A 6/2007
(Continued)

OTHER PUBLICATIONS

International Search Report of PCT/JP2018/045196 dated Feb. 19, 2019 [PCT/ISA/210].
(Continued)

*Primary Examiner* — Peter J MacChiarolo
*Assistant Examiner* — Jermaine L Jenkins
(74) *Attorney, Agent, or Firm* — Sughrue Mion, PLLC (57) ABSTRACT

A tire state detection device that includes: a temperature sensor that detects a temperature in a tire air chamber; an acceleration sensor that detects acceleration associated with rotation of a tire; a pressure sensor that detects pressure in the tire air chamber; a storage unit that stores a plurality of maps for calculating a fatigue state of the tire on the basis of the detected temperature, the detected acceleration and the detected pressure; and a tire fatigue index calculation unit that calculates, by referring to each of the plurality of maps, a tire fatigue index from the detected acceleration, the detected temperature, and the detected pressure.

4 Claims, 6 Drawing Sheets

(56) References Cited

U.S. PATENT DOCUMENTS

| | | |
|---|---|---|
| 2004/0250833 A1 | 12/2004 | Jang |
| 2007/0220962 A1 | 9/2007 | Contreras et al. |
| 2016/0323659 A1 | 11/2016 | Singh et al. |
| 2019/0187026 A1* | 6/2019 | Uhrich .................. B60C 23/002 |
| 2019/0270347 A1* | 9/2019 | Stewart ................ G01M 17/02 |

FOREIGN PATENT DOCUMENTS

| | | |
|---|---|---|
| JP | 5269304 B2 | 8/2013 |
| JP | 2016-210411 A | 12/2016 |
| JP | 2017-202822 A | 11/2017 |
| WO | 2005/118317 A1 | 12/2005 |
| WO | WO-2013015780 A1 * | 1/2013 ............. B60C 23/04 |
| WO | 2017/212756 A1 | 12/2017 |

OTHER PUBLICATIONS

Translation of Written Opinion dated Feb. 19, 2019 from the International Bureau in International Application No. PCT/JP2018/045196.

* cited by examiner

TIRE USE INDEX U

FIG.11

TIRE STATE DETECTION DEVICE FOR DETECTING A STATE OF A TIRE OF A MINE TRANSPORTATION VEHICLE

CROSS REFERENCE TO RELATED APPLICATIONS

This application is a National Stage of International Application No. PCT/JP2018/045196, filed Dec. 8, 2018, claiming priority to Japanese Patent Application No. 2018-087563, filed Apr. 27, 2018.

TECHNICAL FIELD

The present invention relates to a tire state detection device, and more particularly to a tire state detection device for detecting a state of a tire of a mine transportation vehicle.

BACKGROUND

Conventionally, as a method for determining an index of stress received by a tire of a dump truck used for a mine transportation vehicle or the like, there has been disclosed a technique in which a product of a load and a travel distance is calculated from a carrying load and the travel distance measured by a vehicle, and the calculated value is corrected by physical parameters of a mine and the vehicle to thereby obtain an index of the stress (Patent Document 1).

CITATION DOCUMENT

Patent Document

Patent Document 1: Japanese Patent No. 5269304

SUMMARY OF THE INVENTION

Technical Problem

However, the technique disclosed in Patent Document 1 relies on correction by various parameters such as physical parameters of a mine and a vehicle in grasping a state of a tire. These parameters need to be corrected so as to cope with types of vehicles, differences of mines, and road surface states that vary moment by moment in each mine, which leads to a problem that a large number of man-hours are required.

The present invention has been made in view of the above-mentioned problem and aims at providing a tire state detection device capable of detecting a state of a tire by a simpler method.

Solution to Problem

As a configuration of a tire state detection device for solving the above-mentioned problem, there is provided a tire state detection device including: a temperature sensor that detects a temperature in a tire air chamber; an acceleration sensor that detects acceleration associated with rotation of a tire; a pressure sensor that detects pressure in the tire air chamber; a storage means that stores a plurality of maps for calculating a fatigue state of the tire on the basis of the detected temperature, the detected acceleration, and the detected pressure; and a tire fatigue index calculation means that calculates a tire fatigue index from the detected acceleration, the detected temperature and the detected pressure by referring to each of the maps.

Further, as another configuration of the tire state detecting device, there is provided a tire state detection device including: a temperature sensor that detects a temperature in a tire air chamber; an acceleration sensor that detects acceleration associated with rotation of a tire; a pressure sensor that detects pressure in the tire air chamber; a thermal fatigue index calculation means that calculates a thermal fatigue index due to heat of the tire on the basis of a history of the detected temperature; a load fatigue index calculation means that calculates a load fatigue index due to a load on the tire on the basis of a history of the detected acceleration and he detected pressure; and a tire fatigue index calculation means that calculates a tire fatigue index on the basis of the thermal fatigue index and the load fatigue index.

DESCRIPTION OF EMBODIMENT

The present invention will be described in detail below through an embodiment of the invention, however the following embodiment is not intended to limit the inventions set froth in the claims, and all of combinations of the features described in the embodiment are not necessarily essential to the solving means of the invention, and includes configurations which are selectively adopted.

Figure 1:
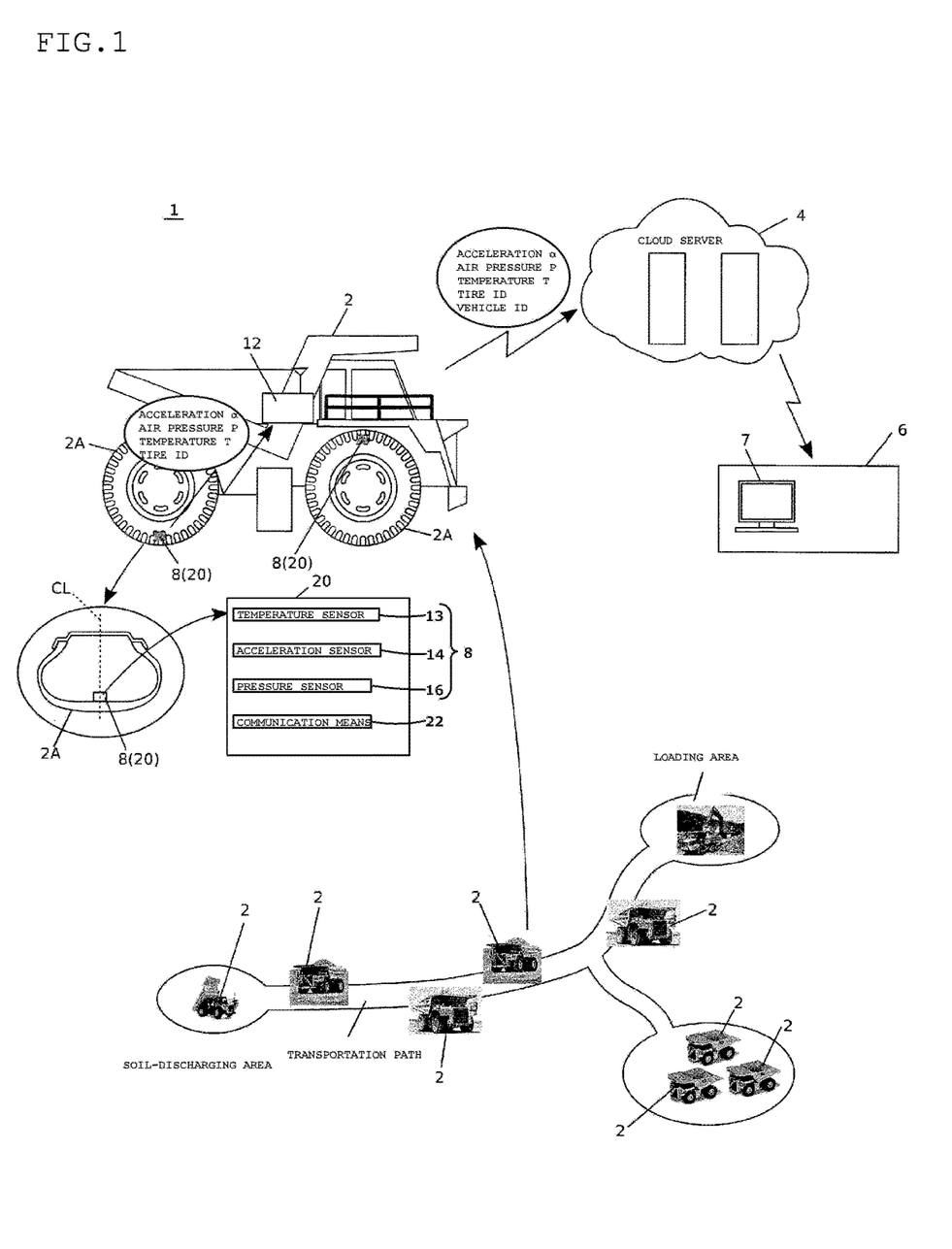
FIG. 1 is a conceptual diagram of a tire state detection device.

FIG. 1 is a schematic diagram illustrating an example of a tire state detection device 1 according to the present embodiment.

The tire state detection device 1 acquires a state of a tire 2A mounted on a vehicle 2 at a date center 4, on the basis of information outputted from a plurality of detection means provided in the vehicle 2 for acquiring an operation state of the vehicle 2, and outputs the acquired information to a control computer 7 of a management office (control center) 6 provided on a mining site for managing operations of the vehicle 2, so as to notify the state of the tire 2A to an operation manager.

As illustrated in FIG. 1, in the mining site, a plurality of vehicles 2 are operated by automatic driving. An automatic drive device (not shown) is mounted on each vehicle 2, and movement of the vehicle 2 is managed on the basis of instructions outputted from the control computer 7 of the management office 6.

Each of the vehicles 2 includes a tire state detection means 8 that detects the state of the tire 2A and a repeater 12 that outputs the information detected by the tire state detection means 8 to the data center 4.

The tire state detection means 8 is provided for each tire 2A mounted on the vehicle 2. The tire state detection means 8 includes, for example, a temperature sensor 13 that detects a temperature in an air chamber of the tire 2A, an acceleration sensor 14 that detects the acceleration applied to the tire 2A, and a pressure sensor 16 that detects air pressure (internal pressure) in the air chamber of the tire 2A.

The temperature sensor 13, the acceleration sensor 14, and the pressure sensor 16 are integrally formed as a module housed in one case, for example, as an in-tire device 20, and mounted at the center (indicated by CL in the figure) in a tire width direction of an inner liner forming a tire inner peripheral surface. In this embodiment, the acceleration sensor 14 is configured to be able to detect acceleration α (alpha) in a tire radial direction of a tread portion of the tire 2A. The in-tire device 20 is provided with a communication means 22 that outputs, to the data center 4, information such as the temperature T, the acceleration α (alpha), and the air pressure P detected respectively by the temperature sensor 13, the acceleration sensor 14, and the pressure sensor 16.

The communication means 22 is configured to be able to communicate with the repeater 12 provided on a vehicle body of the vehicle 2. The communication means 22 is, for example, a wireless communication device, and is configured by, for example, a so-called one-chip IC in which functions as the wireless communication device are aggregated into one. For the communication between the communication means 22 and the repeater 12, when power consumption on the in-tire device 20 side is taken into consideration, for example, a short-range radio communication standard such as Bluetooth (registered trademark) is preferable. The information such as the temperature T, the acceleration α (alpha), and the air pressure P detected respectively by the temperature sensor 13, the acceleration sensor 14, and the pressure sensor 16 are outputted to the data center 4 via the repeater 12.

The in-tire device 20 is provided with a power supply means (not shown) and the like that supplies electric power for operations of the temperature sensor 13, the acceleration sensor 14, the pressure sensor 16, and the communication means 22. For example, a battery is applied as the power supply means Incidentally, power supply to the sensors 13, 14, 16 and the communication means 22 is not limited to resort to the battery, the power supply may be realized by a power generation device which generates power by rotation of the tire 2A. In this case, the power supply means may not be integral with the sensors 13, 14, 16, the communication means 22 and so on, but may be provided as a separate member in the tire.

A device ID is allocated to each of the in-tire devices 20, so that it is possible to determine, at the data center 4, as information inputted from which tire 2A at which position of which vehicle 2. As the device ID, for example, a communication ID may be used which is set to be unique to the communication means 22. The device ID is hereinafter referred to as a tire ID.

The repeater 12 includes a tire-side communication device for enabling communication with the communication means 22 in the in-tire device 20, and a center-side communication device for enabling communication with the data center 4. The tire-side communication device is configured to be communicable with the communication means 22 provided in the in-tire device 20 and, for example, applies a standard for small power radio communication. The center-side communication device is connected to the data center 4 by, for example, a radio communication link connectable to the Internet.

In the center-side communication device, a vehicle ID for identifying the vehicle 2 is set, and the center-side communication device outputs, to the data center 4, the vehicle ID in addition to various information such as the temperature T, the acceleration α (alpha), the air pressure P, and the tire ID inputted via the tire-side communication device. Whereby, the temperature T, the acceleration α (alpha), and the air pressure P inputted to the data center 4 are identified as information inputted from which tire 2A at which position of which vehicle 2.

The data center 4 analyzes a state of the tire 2A on the basis of the time series of the information such as the temperature T, the acceleration α (alpha), the air pressure P and so on inputted from each tire 2A of each vehicle 2, and notifies the state of the tire 2A to the operation manager.

Figure 2:
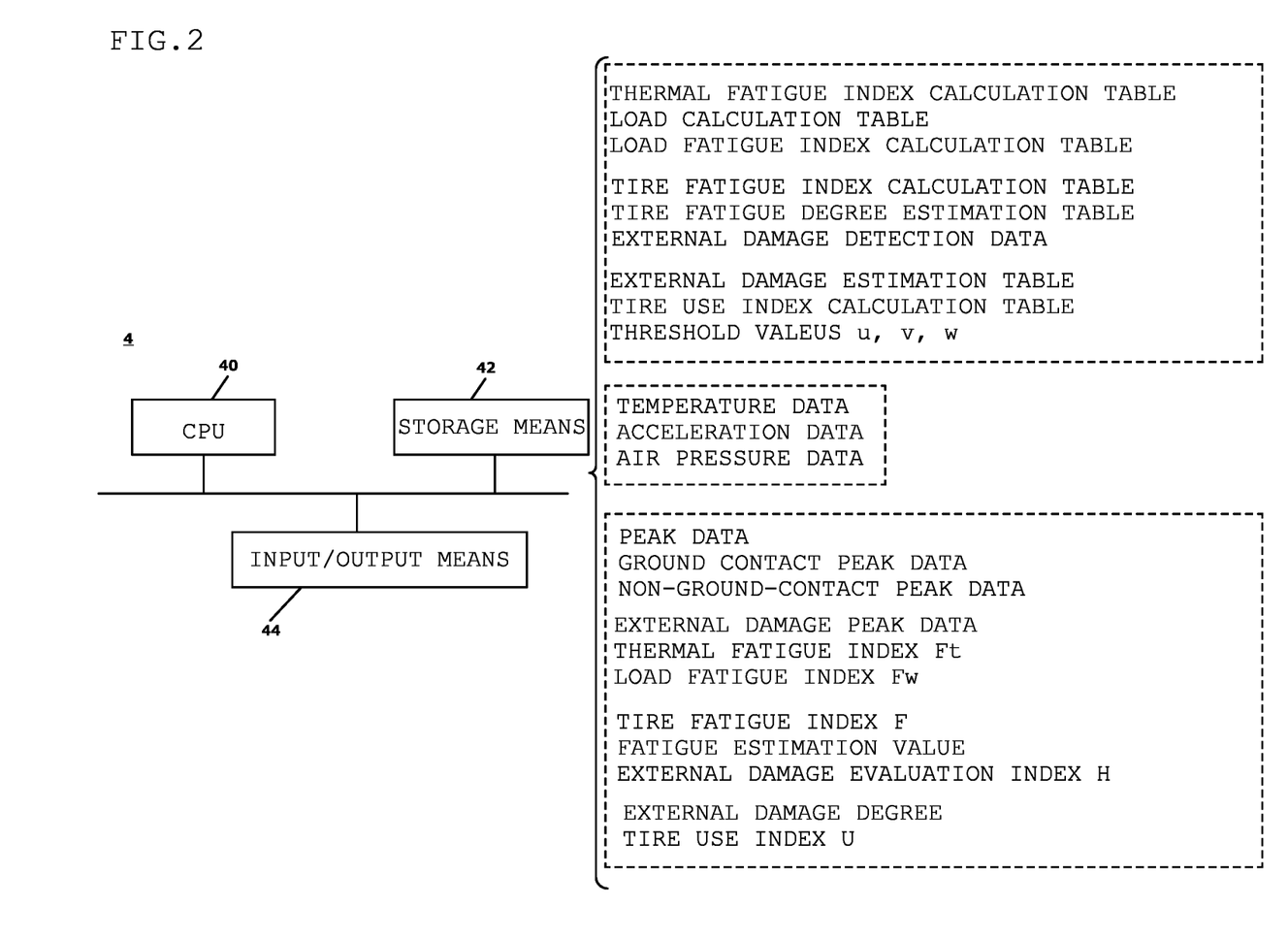
FIG. 2 is a block diagram illustrating a hardware configuration of a data center.

FIG. 2 illustrates a configuration of hardware of the data center 4.

The data center 4 is provided in a place different from the mining site, for example, and is a facility in which IT equipment such as a server and a network device are installed. For example, a facility called a cloud server or the like may be utilized. That is, the data center 4 is mainly composed of a computer, and includes, being provided as hardware resources, a CPU 40 as arithmetic means, storage means 42 such as a ROM and a RAM, and an input/output means 44 for enabling input/output of information to and from the outside.

The storage means 42 stores a program for acquiring the operation state of each vehicle 2 on the basis of the inputted temperature T, the acceleration α (alpha), and the air pressure P. The data center 4 causes the CPU 40 to execute the program stored in the storage means 42, thereby causing the data center 4 to function as respective means to be described later.

The storage means 42 stores, as a history for each vehicle ID, the temperature T, the acceleration α (alpha), and the air pressure P inputted from each vehicle 2 to the data center 4. Further, information such as tables (data map) and determination values to be used in the processing described later are stored in advance in the storage means 42.

The input/output means 44 is configured to be connectable to the vehicle 2 and the control computer 7 of the management office 6 via the Internet connection such as a wire or a wireless link.

Figure 3:
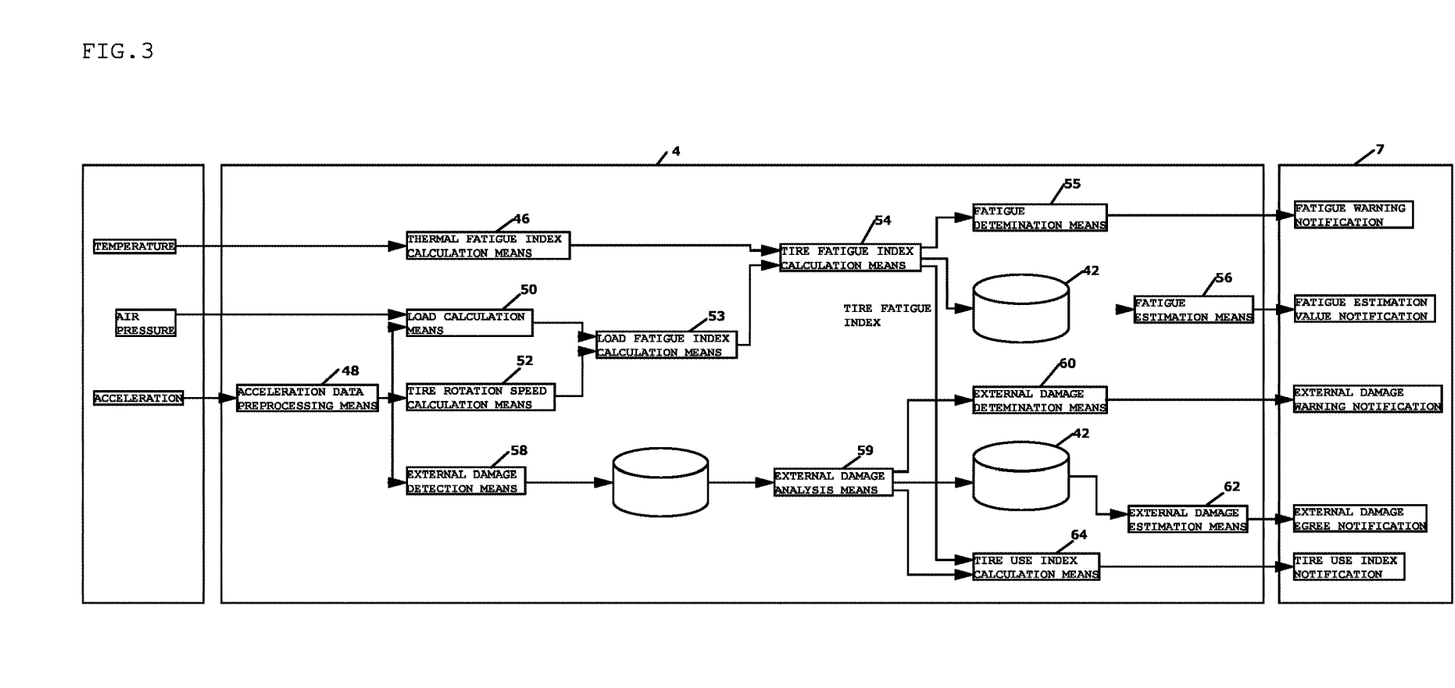
FIG. 3 is a block diagram illustrating a configuration of the data center

FIG. 3 is a block diagram of the data center 4. The data center 4 includes a thermal fatigue index calculation means 46; an acceleration data preprocessing means 48 that processes inputted acceleration data; a load calculation means 50 that calculates a load of each tire 2A of the vehicle 2; a tire rotation number calculation means 52; a load fatigue index calculation means 53; a tire fatigue index calculation means 54; a fatigue determination means 55; a fatigue estimation means 56; an external damage detection means 58; an external damage analysis means 59; an external damage determination means 60; an external damage estimation means 62; and a tire use index calculation means 64.

The thermal fatigue index calculation means 46 calculates, as a thermal fatigue index Ft, a fatigue state of the rubber of the tire 2A caused by heat, on the basis of the temperature T detected by the temperature sensor 13. The thermal fatigue index Ft is a numerical value indicative of a degree of deterioration of the tire 2A due to heat, and is represented, for example, between 0 and 100 where the unused state is set to 0 and the use limit due to the deterioration is set to 100.

The thermal fatigue index calculation means 46 calculates the thermal fatigue index Ft by referring the temperature T to the thermal fatigue index calculation table that has been stored in advance in the storage means 42.

Since the fatigue of the rubber depends on a type of rubber to be used for the tire and a structure of the tire, the thermal fatigue index calculation table is created, for each type of the tire, by acquiring the deterioration limit due to heat from a state of a new tire by a drum test or the like.

The acceleration data preprocessing means 48 executes preprocessing of the acceleration data of each tire 2A in the vehicle 2 to be used in post-stage processing performed by the load calculation means 50, the tire rotation number calculation means 52, the external damage detection means 58 and other means.

Figure 4:
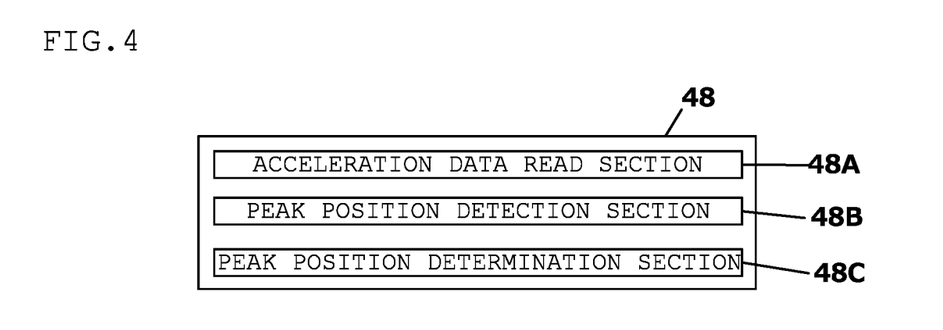
FIG. 4 is a block diagram illustrating a configuration of hardware of a processing means.
Figure 5:
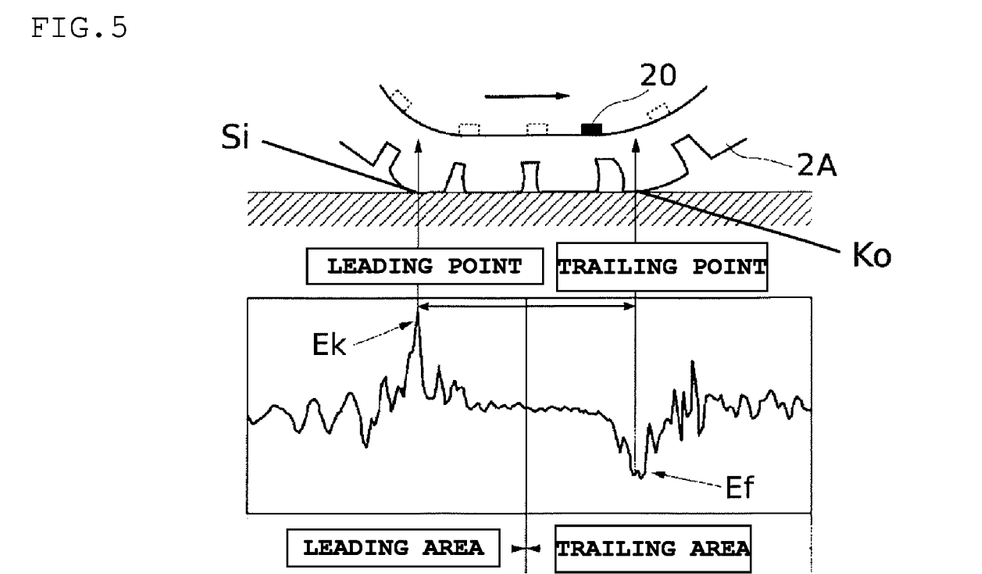
FIG. 5 is a diagram illustrating an example of a waveform of acceleration data.

FIG. 4 is a block diagram illustrating an example of the configuration of the acceleration data preprocessing means 48. FIG. 5 is a diagram illustrating an example of the waveform of the acceleration data. The acceleration data preprocessing means 48 includes an acceleration data reading section 48A, a peak position detection section 48B, and a peak position determination section 48C.

The acceleration data reading section 48A executes reading of the acceleration data stored in the storage means 42.

The peak position detection section 48B detects positions of peaks included in the read acceleration data. Each of the detected peaks is stored as peak data including a position corresponding to each peak and a magnitude thereof. The position referred to here indicates a temporal position in the acceleration data.

The peak position determination section 48C determines, from the peak data detected by the peak position detection section 48B, a position of an end part on the leading side when the tire 2A contacts with a road surface (hereinafter referred to as a leading edge) as Si, a position of an end part on the trailing side when the tire 2A detaches from the road surface (hereinafter, referred to as a trailing edge) as Ko, and other peak positions.

As illustrated in FIG. 5, peaks indicative of the leading edge Si and the trailing edge Ko appear as two positive and negative peaks Ek and Ef in the acceleration data each time the tire 2A rotates for one rotation. For example, the peak Ek appearing first in time series is a peak generated when a position where the in-tire device 20 of the tire 2A is mounted collides with the road surface, and this peak is the leading edge Si. The peak Ef (the sign is opposite to that of the peak Ek) appearing next is a peak generated when a position where the in-tire device 20 of the tire 2A is mounted detaches from the road surface, and this peak is the trailing edge Ko.

Figure 6:
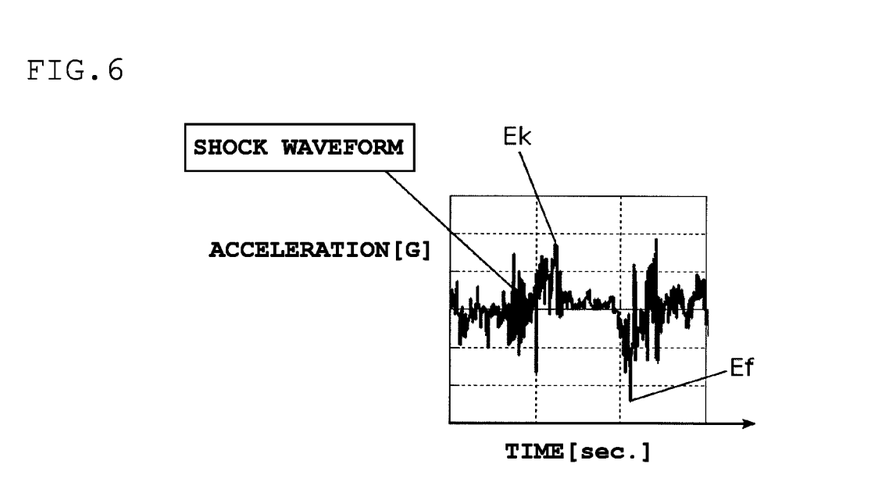
FIG. 6 is a diagram illustrating an example of the waveform of acceleration data when a tire contacts with a stone.

FIG. 6 is a diagram illustrating an example of a waveform of the acceleration data including a shock waveform when the tire is brought into contact with a stone. In addition, in a case where an excessive input (hereinafter referred to as "large input") occurs when the tire is brought into contact with a stone or steps on a large unevenness formed on a stone or a road surface, a shock waveform as illustrated in FIG. 6 is included in the waveform of the acceleration data. That is, a peak other than the peaks Ek and Ef respectively indicative of the leading edge Si and the trailing edge Ko appears in the waveform of the acceleration data.

Thus, the peak position determination section 48C assumes, from the peak data detected in the acceleration data, the position of the positive-side peak appearing at a time position earlier in time series as the position t11 of the leading edge Si, and the position of the negative-side peak appearing next in the time series as the position t12 of the trailing edge Ko, and stores these positions. In addition, the peak position determination section 48C assumes positions of two positive and negative peaks sequentially appearing next to be a time (position) t21 of the next leading edge Si and a position t22 of the next trailing edge Ko, respectively, and stores these positions.

Figure 7:
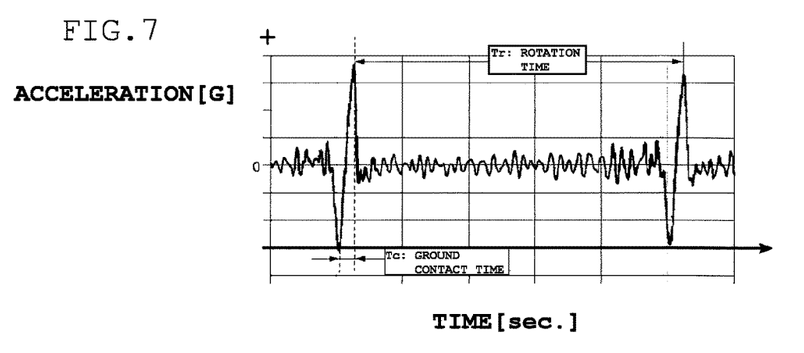
FIG. 7 is a diagram illustrating a relationship among an acceleration waveform, a ground contact time, and a rotation time.

FIG. 7 is a diagram illustrating a relation between a ground contact time Tc and a rotation time Tr in the acceleration data.

Next, based on the above-mentioned assumptions, the ground contact time Tc and the rotation time Tr when the tire 2A rotates for one rotation, which are illustrated in FIG. 7, are calculated. First, the ground contact time Tc is calculated on the basis of the position t11 of the leading edge Si and the position t12 of the trailing edge Ko that are assumed to appear first in time series. Specifically, the ground contact time Tc is calculated by formula: the position t12 of the trailing edge Ko minus the position t11 of the leading edge Si.

Next, a rotation time Tr is calculated on the basis of the position t11 of the leading edge Si assumed first and the position t21 of the leading edge Si assumed next. Specifically, the rotation time Tr is calculated by the formula: the position t21 of the leading edge Si minus the position t11 of the leading edge Si. Incidentally, the rotation time Tr may be calculated from the difference between the position t12 of the trailing edge Ko and the position t22 of the next trailing edge Ko. Here, the difference between the position t21 of the leading edge Si and the position t12 of the trailing edge Ko is the non-ground-contact time Tx.

Next, a ground contact time ratio K is calculated, and it is determined with the use of the ground contact time ratio K whether or not the above-mentioned assumptions are correct. The ground contact time ratio K is an occupying ratio of the ground contact time Tc when the tire 2A rotates for one rotation at the rotation time Tr, and is calculated by Tc/Tr.

Next, a ground contact time ratio range [K1, K2] is set with respect to the calculated ground contact time ratio K, and K is compared with the lower limit value K1 of the ground contact time ratio range and the upper limit value K2 of the ground contact time ratio range, and it is determined whether or not the ground contact time ratio K is within the ground contact time ratio range.

For example, in a case where the position of the large input is estimated to be the position of the subsequent trailing edge Ko, the calculated rotation time Tr becomes shorter than an actual rotation time, and in a case where the position of the large input is estimated to be the subsequent leading edge Si, the calculated ground contact time Tc becomes shorter than an actual ground contact time. Thus, by setting the ground contact time ratio range [K1, K2] as a determination criterion for obtaining a correct position of the leading edge Si and a correct position of the trailing edge Ko, and by determining the peaks, it becomes possible to accurately detect the position of the leading edge Si and the position of the trailing edge Ko, whereby erroneous detection of the position of the leading edge Si and the position of the trailing edge Ko can be prevented.

That is, the peak position determination section 48C determines whether or not the calculated ground contact time ratio K is within the preset ground contact time ratio range [K1, K2]. In a case where the ground contact time ratio K is within the ground contact time ratio range (K1≤K≤K2), t11, t12 and t22 that are estimated in the leading/trailing position estimation section are determined as the actual position of the leading edge Si and the actual positions of the trailing edge Ko (normal position), respectively. The peaks determined as the normal positions are stored in the storage means 42 as ground contact peak data.

On the other hand, when the ground contact time ratio K is outside of the ground contact time ratio range (K<K1 or K>K2), it is determined that one or two or all of the estimated positions t11 of the leading edge Si and t12, t22 of the trailing edge Ko, is (are) not the actual position of the leading edge Si and the actual position(s) of the trailing edge Ko (erroneous estimation). In a case where the erroneous estimation is made, the combination of the positions of the peaks is changed, and the ground contact time ratio K is calculated again, so that the detected position of the leading edge Si, the detected position of the trailing edge Ko, and the other peaks are discriminated. The peaks other than the leading edge Si and the trailing edge Ko are stored in the storage means 42 as non-ground-contact peaks. The ground contact time Tc and the rotation time Tr for one rotation of the tire obtained in the above-mentioned calculation process are stored in the storage means 42.

The non-ground-contact peak determined by the above-described determination processing may be determined as being caused by an impact occurred when running on an irregular ground surface such as when the tire 2A collides with a stone or the like, or when the tire 2A steps over a stone or an uneven surface.

The load calculation means 50 calculates a load W of the tire 2A on the basis of the ground contact time K and the air pressure P that are stored in the storage means 42.

The ground contact length L of the tire 2A varies depending on the load W applied to the tire 2A and the air pressure P of the tire 2A. Specifically, the ground contact length L is in a substantially linear proportional relationship such that, with respect to the load W, the larger the load W applied to the tire 2A is, the longer the length L becomes (the ground contact time ratio K becomes larger) and the smaller the load W is, the shorter the length L becomes (the ground contact time ratio K becomes smaller). On the other hand, with respect to the air pressure P, the higher the air pressure P is, the smaller the length L becomes, and the lower the air pressure P is, the longer the length L becomes.

Therefore, by correcting the calculated ground contact time ratio K with the use of the detected air pressure P, the accuracy of estimation of the load W can be improved. The ground contact length L mentioned herein is calculated, on the basis of the position of the leading edge Si and the position of the trailing edge Ko that are stored as the ground contact peak data, and is represented by time.

In the present embodiment, the ground contact time ratio K calculated on the basis of the inputted acceleration data is treated to mean the ground contact length L at a reference air pressure P0. The reference air pressure P0 refers to a recommended value that is set, as an appropriate air pressure, on the tire 2A for each of different vehicles or for each position of the vehicle 2 at which the tire 2A is mounted. In the following description, the ground contact time ratio K calculated in association with the reference air pressure P0 is shown as the ground contact time ratio K0.

Assuming now that the ground contact time ratio is Kp when the air pressure P detected by the pressure sensor 16 is p, the ground contact time ratio Kp may be calculated as having a relationship with the calculated ground contact time ratio K0, as Kp=K0+m (p−P0). Here, m is a negative value (m<0), and is a coefficient that is set by calculating the relationship between the air pressure and the ground contact time ratio in advance.

The load calculation means 50 first compares, in calculation of the load W, the pressure P measured by the pressure sensor 16 with the reference air pressure P0. In a case where there is no difference between the air pressure P and the reference air pressure P0, the ground contact time K0 stored in the storage means 42 is assumed as the ground contact time ratio Kp, and in a case where there is a difference between the detected air pressure P and the reference air pressure P0, the ground contact time ratio K0 is corrected using the above-mentioned correction equation.

Then, the load calculation table previously stored in the storage means 42 is read, and the load Wp of the tire 2A is calculated by referring the obtained ground contact time ratio Kp to the load calculation table. The load calculation table is a table in which a relation between the magnitude of the ground contact time ratio and the load has been obtained in advance with the reference air pressure P0 used as a reference. The calculated load W is outputted to the storage means 42 and stored as load history data.

The tire rotation speed calculation means 52 calculates a tire rotation speed per unit time on the basis of the rotation time Tr stored in the storage means 42, for example. Specifically, the number of rotations of the tire per unit time is obtained by calculating an inverse number of the rotation time Tr. The calculated tire rotation speed is outputted to the storage means 42, and recorded as a history of the tire rotation speed, that is, as travel distance data.

The load fatigue index calculation means 53 calculates the load fatigue index Fw indicative of a degree of fatigue due to a load on the tire on the basis of the load history and the tire rotation speed (travel distance).

The load fatigue index Fw may be calculated, for example, as follows. Namely, a load fatigue index calculation table for calculating the load fatigue index Fw of the tire 2A is stored in the storage means 42 in advance, and the load fatigue index Fw indicative of a fatigue state of the tire due to the load is calculated by referring the calculated value of the load and the tire rotation speed (traveled distance) to the load fatigue index calculation table.

It is preferable to create the load fatigue index calculation table, for example, for each type of the tire, specifically for each structure of the tire. The load fatigue index calculation table may be created on the basis of a test result of an on-machine test such as a drum test of the tire 2A or a test result of a running test with tires mounted on an actual vehicle. The load fatigue index Fw calculated by the load fatigue index calculation means 53 is represented by a numerical value of 0 to 100 such as 30, 50, 80 and so on according to the calculated value of the load and the tire rotation speed, where the numeral value 100 represents that the state of the tire 2A has reached a state in which a malfunction may possibly occur.

The setting of the index is not limited to the above-described example, and may be appropriately changed. The calculated load fatigue index Fw is outputted to the storage means 42, and stored as load fatigue index data or the like, for example.

Figure 8:
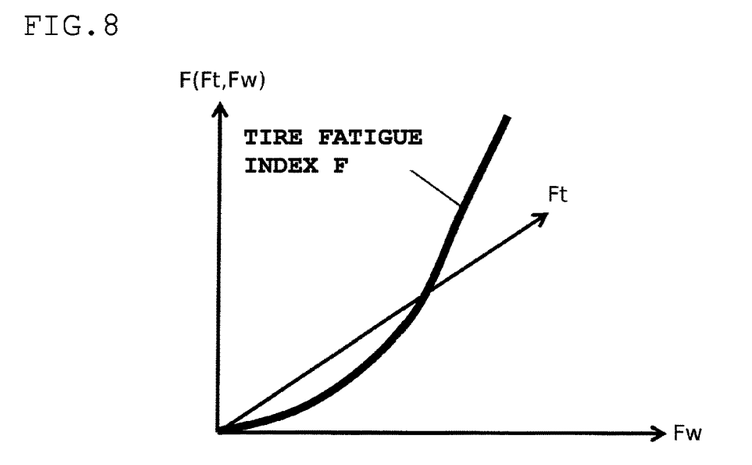
FIG. 8 is a conceptual diagram of a tire fatigue index calculation table.

FIG. 8 is a conceptual diagram of the tire fatigue index calculation table. The tire fatigue index calculation means 54 calculates a tire fatigue index F indicative of a degree of total fatigue of the tire 2A on the basis of the heat fatigue index calculation means 46 and the load fatigue index calculation means 53.

The tire fatigue index F may be calculated as follows, for example. Namely, the tire fatigue index calculation table for calculating the tire fatigue index is stored in advance in the storage means 42 and, by referring the thermal fatigue index Ft and the load fatigue index Fw to the tire fatigue index calculation table, the tire fatigue index F indicative of the fatigue state of the tire 2A which has not reached the use limit is calculated.

As illustrated in FIG. 8, it is preferable to create the tire fatigue index calculation table, for example, for each type of the tire, specifically for each structure of the tire. The tire fatigue index calculation table may be created on the basis of a test result of an on-machine test such as a drum test of the tire 2A or a test result of a running test with tires mounted on an actual vehicle.

The calculated tire fatigue index F is represented by a numerical value of 0 to 100, such as 30, 50, 80 and so on according to the thermal fatigue index Ft and the load fatigue index Fw, by the combination of the thermal fatigue index Ft and the load fatigue index Fw, where the numeral value 100 represents that the tire has reached a state in which a malfunction may possibly occur.

The setting of the index is not limited to the above-described example, and may be appropriately changed. The calculated tire fatigue index F is outputted to the storage means 42, and stored as, for example, tire fatigue index data or the like.

The fatigue determination means 55 determines whether or not the fatigue state of the tire 2A is in a dangerous state on the basis of the tire fatigue index F. As an example of specific processing, it is determined whether or not the fatigue state of the tire 2A is in a dangerous state or not depending on whether or not the size of the tire fatigue index F is larger than a threshold value u. The threshold value u is a determination value for determining the fatigue state of the tire 2A. In a case where the tire fatigue index F is larger than the threshold value u, it is determined that the tire is in a dangerous state, and the determination is outputted to the control computer 7. In a case where the tire fatigue index F is less than or equal to the threshold value u, monitoring is continued.

The fatigue estimation means 56 estimates the fatigue state of the tire 2A on the basis of the tire fatigue index F calculated by the tire fatigue index calculation means 54. The fatigue state of the tire 2A may be estimated as follows, for example. Namely, the tire fatigue state estimation table for estimating the fatigue state of the tire 2A is stored in the storage means 42 in advance and, by referring the tire fatigue index F calculated by the tire fatigue index calculation means 54 to the tire fatigue state estimation table, a fatigue estimation value of the tire 2A is calculated.

The tire fatigue estimation value, for example, is represented by a numerical value of 0 to 100, such as for example, 30, 50, 80 and so on according to the tire fatigue index F, where the numerical value of 100 represents a state in which a malfunction may possibly occur. When the tire fatigue state estimation table is created, for example, it is preferable to set in such a manner that a fatigue estimation value is calculated taking a safety factor into consideration. For example, when the safety factor is set to 2 and the tire fatigue index F is 20, a value of 2×20=40 is outputted as the fatigue estimation value. When the tire fatigue index F is 50, a value of 2×50=100 is outputted as the fatigue estimation value and, from this value, for example, it is understood that replacement of the tire is necessary. The tire fatigue state estimation data may be created on the basis of a result of a durability test in the tire development or a past use history. The estimated fatigue estimation value is outputted to the operation management computer 7 of the management office 6 via the input/output means 44

For example, in a mine vehicle or the like, because it can be considered that change in severity of cargo handling is small (that is, since the fatigue progresses substantially in proportion to the time), an administrator can easily infer the timing at which the fatigue estimation value becomes 50 from the past use history. Therefore, the administrator can easily grasp which tire 2A of which vehicle 2 should be replaced in future by checking the numerical value of the fatigue estimation value, and can realize planned maintenance of the tire 2A of the vehicle 2 such as replacement to a new tire and rotation of the tires, and operation management as well.

The external damage detection means 58 detects a peak that may cause an external damage to the tire 2A from the non-ground-contact peak data stored in the storage means 42. The external damage detection means 58 detects the peak that may cause damage (external damage) to the tire by referring the external damage detection data to the non-ground-contact peak data.

The external damage detection data is a database in which waveforms of the acceleration that may cause an external damage to the tire 2A are collected. Therefore, by matching a reference waveform constituting the external damage detection data to the non-ground-contact peak data, the external damage detection means 58 can determine whether or not the waveform is a waveform that causes external damage. The peak detected by the external damage detection means 58 is outputted to the storage means 42 as external damage peak data and stored in the storage means 42.

Figure 9:
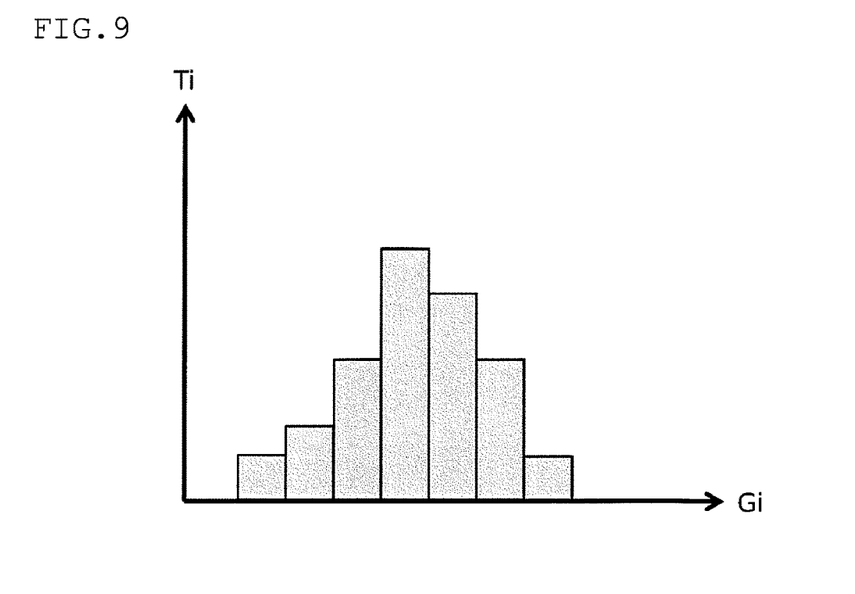
FIG. 9 is a conceptual diagram of an external damage evaluation index H.

FIG. 9 is a conceptual diagram of an external damage evaluation index H.

The external damage analysis means 59 analyzes to what extent an external damage is caused by individual external damage peaks in the external damage peak data, and calculates the external damage evaluation index H. The external damage analysis means 59 classifies external damage peaks, for example, into a plurality of stages in accordance with sizes of the external damage peaks, and sets an evaluation value Gi (i=1, 2, 3 . . . ) for each classification. The external damage peaks may be classified according to the sizes thereof with respect to a plurality of preset threshold values v. The threshold value v may be set, for example, as v1<v2<v3< . . . <vi. When the size of the external damage peak is smaller than the threshold value v1, the evaluation value G1 is set to 1, when the size of the external damage peak is equal to or larger than the threshold value v2 and smaller than the threshold value v3, the evaluation value G2 is set to 2, and when the size of the external damage peak is equal to or larger than the threshold value v3, the evaluation value G3 is set to 3 and so on.

Next, the external damage analysis means 59 calculates, for each evaluation value Gi, an appearance frequency Ti of the external damage peaks classified by the evaluation value Gi.

The external damage analysis means 59 calculates the external damage evaluation index H for evaluating the state of the external damage. The external damage evaluation index H is calculated by, for example, H=Σ hi Gi Ti (i=1, 2, 3 . . . ). Incidentally, hi is a coefficient in the calculation, and is set to a different value for each tire because it depends on the sensitivity of the tire 2A.

The external damage state determination means 60 determines whether or not the state of the external damage of the tire 2A is such a state that may cause damages on the tire 2A, on the basis of the external damage evaluation index H. As an example of specific processing, the external damage state determination means 60 determines whether or not the tire 2A is in a state where replacement is required depending on whether or not the size of the external damage evaluation index H is larger than the threshold value w. The threshold value w is a determination value for determining the use limit of the tire 2A. In a case where the size of the external damage evaluation index H is larger than the threshold value w, it is determined that the damage of the tire 2A is in a dangerous state. In a case where the index H is equal to or smaller than the threshold value w, it is determined that it is still not in the dangerous state. When the damage of the tire 2A is determined to be in the dangerous state, the determined information is outputted to the control computer 7.

In the processing by the external damage state determination means 60, the state of the external damage of the tire 2A is determined by one threshold value w, however, it is not limited to this. For example, a plurality of threshold values may be set as w1<w2<w3 ... and so on, and the state of the external damage may be determined in detail depending on within which threshold value range the external damage evaluation index H lies.

The external damage estimation means 62 estimates timing at which the tire 2A reaches the use limit on the basis of the external damage evaluation index H. A state of the external damage of the tire 2A may be estimated as follows, for example. Namely, a degree of external damage is estimated by referring the external damage evaluation index H to the external damage estimation table stored in advance in the storage means 42. The external damage estimation table uses the external damage evaluation index H as a variable, and calculates the external damage degree indicative of the degree of external damage of the tire 2A. The degree of external damage (the external damage degree) is represented by a numerical value between 0 and 100 where 100 indicates malfunction occurrence. It is preferable to create the external damage estimation table taking a safety factor into consideration. For example, when the safety factor is set to 2, and the external damage evaluation index H is 20, the value 2×20=40 is outputted as the external damage degree. When the external damage evaluation index H is 50, the value 2×50=100 is outputted as the external damage degree, from which it is understood that replacement of the tire is necessary, for example. In a mine vehicle or the like, it can be considered that change in severity of the cargo handling is small (that is, since the fatigue progresses substantially in proportion to the time), and the timing at which the external damage degree becomes 50 can be inferred from the past use history, hence it is possible to realize planned maintenance of a tire or a vehicle, including the replacement of the tire.

The external damage estimation table may be created on the basis of the result of the durability test performed in the tire development or the like, or the past use history. The estimated external damage degree of the tire is outputted to the control computer 7 of the management office 6 via the input/output means 44.

Figure 10:
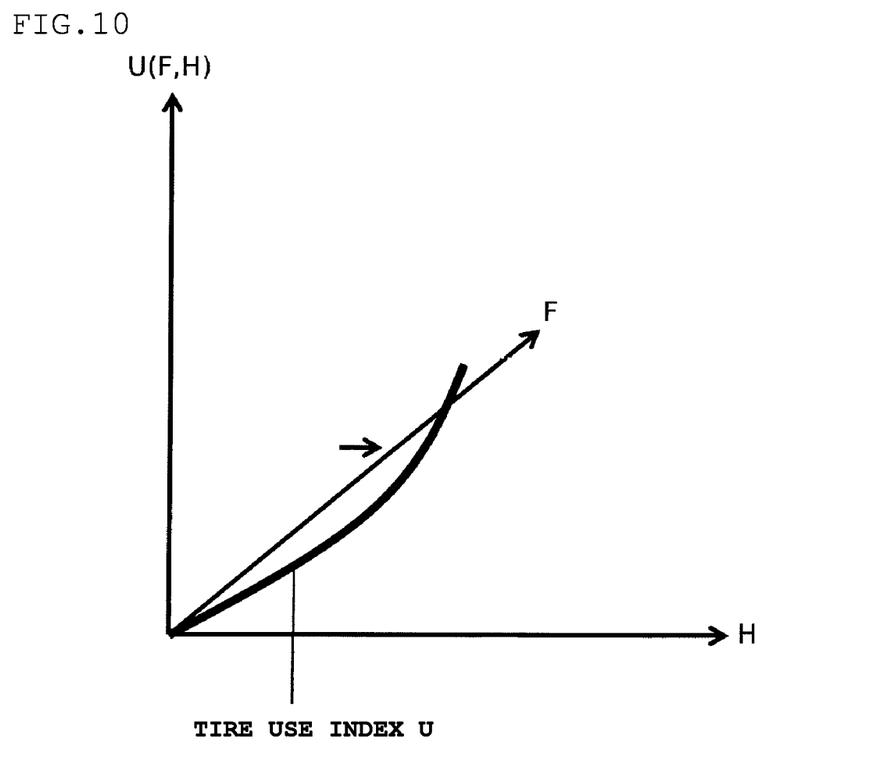
FIG. 10 is a conceptual diagram of a tire use index calculation table.

FIG. 10 is a conceptual diagram of a tire use index calculation table.

The tire use index calculation means 64 calculates a tire use index U on the basis of the tire fatigue index F and the external damage evaluation index H calculated respectively by the tire fatigue index calculation means 54 and the external damage analysis means 59. The tire use index U may be calculated as follows, for example. Namely, the tire use index calculation table for calculating the tire use index U is stored in advance in the storage means 42, and the tire use index U is calculated by referring the tire fatigue index F and the external damage evaluation index H to the tire use index calculation table.

The tire use index U is represented by a numerical value of 0 to 100, such as, for example, 30, 50, 80 and so on according to the tire fatigue index F and the external damage evaluation index H, where the numerical value of 100 represents a state in which the tire 2A reaches the use limit. The calculated tire use index U is outputted to the control computer 7 of the management office 6 via the input/output means 44. The tire use index U may be considered, for example, as an index indicative of a charge amount.

The control computer 7 is a computer installed in the management office 6 provided in a site, and, for example, performs management and control of travel control (travel route) of each vehicle 2 in the site.

The control computer 7 displays information inputted from the data center 4 on a monitor through a communication channel such as the Internet. That is, the control computer 7 functions as a notification means that notifies the state of each tire 2A mounted on each vehicle 2.

Hereinafter, the operation of the operation management device 1 will be described.

The information detected by the temperature sensor 13, the acceleration sensor 14 and the pressure sensor 16 provided on each tire 2A of each vehicle 2 are inputted to the data center 4.

The information such as temperature T, acceleration α (alpha), air pressure P and so on inputted to the data center 4 are stored as temperature data, acceleration data, air pressure data and so on, respectively, as time series data in the storage means 42. Processing by each means is executed on the basis of these data.

In the data center 4, the thermal fatigue index calculation means 46 calculates, on the basis of the temperature data, the thermal fatigue index Ft indicative of the fatigue of rubber due to heat generated in association with the use of each tire 2A.

The pre-processing by the acceleration data preprocessing means 48 is performed on the acceleration data out of the inputted information. The acceleration data is read by the acceleration data read section 48A in the acceleration data preprocessing means 48, and positions of peaks in the acceleration data are detected by the peak position detection section 48B, and generated as peak data. The generated peak data are discriminated by the peak position discrimination section 48C into the ground-contact peak data of the time when the tire 2A contacts with the road surface, and the non-ground-contact peak data, and the ground contact time Tc and the rotation time Tr for one rotation of the tire are calculated on the basis of the ground contact peak data obtained by the above-described determination.

Next, the load calculation means 50 calculates the load W applied to each tire 2A on the basis of the calculated ground contact time ratio K and the inputted air pressure data.

Next, on the basis of the calculated rotation time Tr, the rotation number (tire rotation speed) of the tire 2A is calculated by the tire rotation number calculation means 52.

Next, on the basis of the load W and the tire rotation speed, the load fatigue index Fw indicative of the mechanical fatigue resulting from the use of the tire 2A is calculated by the load fatigue index calculation means 53.

Next, on the basis of the thermal fatigue index Ft and the load fatigue index Fw, the tire fatigue index F indicative of the state of the total fatigue of the tire 2A is calculated by the tire fatigue index calculation means 54.

Next, on the basis of the tire fatigue index F, the fatigue determination means 55 determines whether or not the fatigue of the tire 2A is in a dangerous state, and the fatigue estimation means 56 estimates the fatigue state of the tire 2A. The determination result determined by the fatigue determination means 55 and the fatigue state of the tire estimated by the fatigue estimation means 56 are outputted to the control computer 7.

On the basis of the non-ground-contact peak data, the external damage detection means 58 detects a peak that may cause an external damage to the tire 2A, and generates the external damage peak data.

Next, on the basis of the external damage peak data, the external damage analysis means 59 classifies external damage peaks in the external damage peak data by using the evaluation value Gi according to the size of the peak in terms of to what extent the external damage peak causes the external damage, calculates the appearance frequency Ti of the external damage peak classified for each evaluation value Gi, and calculates the external damage evaluation index H by H=Σ hi Gi Ti (i=1, 2, 3 . . . ).

Next, on the basis of the external damage evaluation index H, the external damage state determination means 60 determines whether or not the state of the external damage is dangerous. When it is determined that the external damage of the tire 2A is in a dangerous state, the determined information is outputted to the control computer 7.

Further, on the basis of the external damage evaluation index H, the external damage estimation means 62 calculates the external damage degree indicative of the state of deterioration due to the external damage of the tire 2A.

Next, on the basis of the tire fatigue index F and the external damage evaluation index H calculated by the tire fatigue index calculation means 54 and the external damage analysis means 59, the tire use index calculation means 64 calculates the tire use index U, and outputs the tire use index U to the control computer 7.

As described above, the fatigue degree of the tire can be accurately estimated by directly measuring the tire, not by based on, as in the conventional art, indirect information such as the vehicle information and the mine information. The sensors measure the temperature, the pressure and the acceleration of the tire, the measured data are transferred from the sensors to the data center outside of the vehicle via the vehicle-mounted device, and by analyzing, at the data center, the temperature, the pressure and the acceleration detected by the sensors, the fatigue degree of each tire can be communicated to a person in charge. Then, future prediction of the tire fatigue degree is performed from the history of the fatigue degree so as to be able to recommend the tire replacement timing. In a case where the tire is in a dangerous state, the tire replacement may be recommended.

In general, tires are sold in the unit of one tire as a product, however, by the present technology, it is possible to charge according to the tire use index U calculated as the accumulation of the fatigue index of the tire. That is, by charging with the use of the tire use index U as the use amount, an initial investment on the tire in the vehicle can be reduced. Further, when reusing a tire before expiration of the life of the tire, because charging can be made similarly on the basis of a remaining fatigue margin up until the replacement, it is possible to realize a more flexible pattern of tire use or a more flexible sales pattern.

Figure 11:
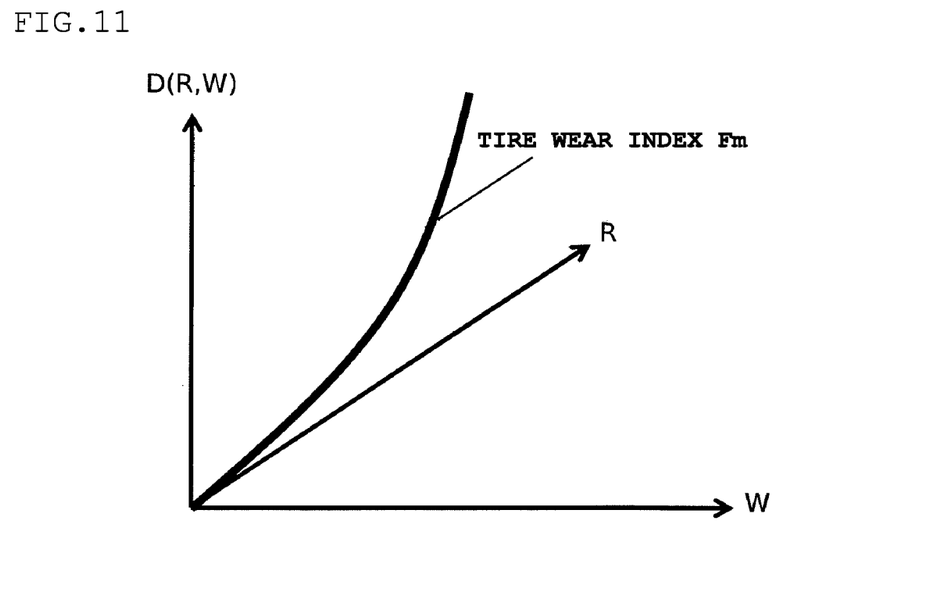
FIG. 11 is a conceptual diagram of a tire wear estimation table.

FIG. 11 is a conceptual diagram of a tire wear estimation table. The load fatigue index Fw explained in the above-described embodiment may be calculated, for example, on the basis of the wear state of the tire 2A. That is, the tire wear index Fm, which is obtained from the load W and the tire rotation speed, may be used as the load fatigue index Fw. The wear of the tire 2A is substantially proportional to the tire rotation speed, however, there is also a facilitatory effect caused by the load W. Therefore, it may be arranged such that the tire wear estimation table, as illustrated in FIG. 11, for calculating the tire wear index Fm from the load W and the tire rotation speed, is stored in the storage means 42 in advance, and the tire wear index Fm is calculated according to the load W and the tire rotation speed.

In summary, the present invention may be described as follows. That is, as a configuration of a tire state detection device, there is provided a tire state detection device which includes: a temperature sensor that detects a temperature in an air chamber of a tire; an acceleration sensor that detects acceleration associated with rotation of the tire; a pressure sensor that detects pressure in the tire air chamber; a storage means that stores a plurality of maps for calculating a fatigue state of the tire on the basis of the detected temperature, the detected acceleration, and the detected pressure; and a tire fatigue index calculation means that calculates, by referring to each of the maps, a tire fatigue index from the detected acceleration, the detected temperature and the detected pressure.

According to this configuration, a state of a tire can be easily and accurately detected regardless of types of vehicles, differences of mines, and road surface states that change moment by moment in each mine.

Further, as another configuration of the tire state detecting device, there is provided a tire state detection device which includes: a temperature sensor that detects a temperature in an air chamber of a tire; an acceleration sensor that detects acceleration associated with rotation of the tire; a pressure sensor that detects pressure in the tire air chamber; a thermal fatigue index calculation means that calculates a thermal fatigue index due to heat of the tire on the basis of a history of the detected temperature; a load fatigue index calculation means that calculates a load fatigue index due to a load on the tire on the basis of histories of the detected acceleration and the detected pressure; and a tire fatigue index calculation means that calculates a tire fatigue index on the basis of the thermal fatigue index and the load fatigue index.

According to this configuration, the state of the tire can be easily and more accurately detected regardless of types of vehicles, differences of mines, and road surface states that change moment by moment in each mine.

Further, as another configuration of the tire state detecting device, the tire state detection device is provided with a tire use index calculation means that calculates a tire use amount on the basis of the tire fatigue index.

According to this configuration, even though tires have been conventionally sold in the unit of one tire as a product in general, however, it is possible to charge according to the tire use index. That is, by charging with the use of the tire use index as the use amount, an initial investment on the tire in the vehicle can be reduced. Further, when reusing a tire before expiration of the life of the tire, because charging can be made similarly on the basis of a remaining fatigue margin up until the replacement, it is possible to realize a more flexible pattern of tire use or a more flexible sales pattern.

REFERENCE SIGN LIST

1: operation management device, 2: vehicle, 4: data center, 6: management office, 7: control computer.

The invention claimed is:

1. A tire state detection device comprising:
a temperature sensor that detects a temperature in an air chamber of a tire;
an acceleration sensor that detects acceleration associated with rotation of the tire;
a pressure sensor that detects pressure in the air chamber of the tire;
a storage means that stores a plurality of maps for calculating a fatigue state of the tire on the basis of the detected temperature, the detected acceleration and the detected pressure;
a tire fatigue index calculation means that calculates, by referring to each of the plurality of maps, a tire fatigue index from the detected acceleration, the detected temperature and the detected pressure; and
a tire use index calculation means that calculates a tire use amount on the basis of the tire fatigue index.

2. A tire state detection device comprising:
a temperature sensor that detects a temperature in an air chamber of a tire;
an acceleration sensor that detects acceleration associated with rotation of the tire;
a pressure sensor that detects pressure in the air chamber of the tire; and
at least one processor configured to
calculate a thermal fatigue index due to heat of the tire on the basis of a history of the detected temperature;
calculate a load fatigue index due to a load on the tire on the basis of histories of the detected acceleration and the detected pressure; and
calculate a tire fatigue index on the basis of the thermal fatigue index and the load fatigue index.

3. The tire state detection device according to claim 2, wherein the at least one processor is configured to calculate a tire use amount on the basis of the tire fatigue index.

4. A tire state detection device comprising:
a temperature sensor that detects a temperature in an air chamber of a tire;
an acceleration sensor that detects acceleration associated with rotation of the tire;
a pressure sensor that detects pressure in the air chamber of the tire;
a thermal fatigue index calculation means that calculates a thermal fatigue index due to heat of the tire on the basis of a history of the detected temperature;
a load fatigue index calculation means that calculates a load fatigue index due to a load on the tire on the basis of histories of the detected acceleration and the detected pressure;
a tire fatigue index calculation means that calculates a tire fatigue index on the basis of the thermal fatigue index and the load fatigue index; and
a tire use index calculation means that calculates a tire use amount on the basis of the tire fatigue index.

* * * * *